(12) United States Patent
Jew et al.

(10) Patent No.: US 10,520,590 B2
(45) Date of Patent: Dec. 31, 2019

(54) SYSTEM AND METHOD FOR RANGING A TARGET WITH A DIGITAL-PIXEL FOCAL PLANE ARRAY

(71) Applicant: BAE SYSTEMS INFORMATION AND ELECTRONIC SYSTEMS INTEGRATION INC., Nashua, NH (US)

(72) Inventors: Jeffrey L. Jew, Brookline, NH (US); Paul R. Moffitt, Hollis, NH (US); Leonard A. Pomeranz, Hollis, NH (US); Hermanus S. Pretorius, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 338 days.

(21) Appl. No.: 15/490,554

(22) Filed: Apr. 18, 2017

(65) Prior Publication Data

US 2018/0299535 A1 Oct. 18, 2018

(51) Int. Cl.
*G01S 7/48* (2006.01)
*G01S 17/10* (2006.01)
*G01S 7/487* (2006.01)

(52) U.S. Cl.
CPC ............ *G01S 7/4865* (2013.01); *G01S 7/487* (2013.01); *G01S 7/4863* (2013.01); *G01S 17/10* (2013.01)

(58) Field of Classification Search
CPC .......... F41G 7/26; F41G 3/145; F41G 7/2293; F41G 7/226; G01S 7/4804; G01S 7/487; G01S 3/784; G01S 7/4863
See application file for complete search history.

(56) References Cited

U.S. PATENT DOCUMENTS

| 6,307,202 | B1 | 10/2001 | Manalis |
|---|---|---|---|
| 8,406,859 | B2 | 3/2013 | Zuzak |
| 8,471,205 | B2 | 6/2013 | Gertsenshteyn |
| 8,605,853 | B2 | 12/2013 | Schultz |

(Continued)

FOREIGN PATENT DOCUMENTS

| WO | 2010019515 A2 | 2/2010 |
|---|---|---|
| WO | 2012018568 A2 | 2/2012 |

(Continued)

OTHER PUBLICATIONS

Schultz, Kenneth I., et al. "Digital-pixel focal plane array technology." Lincoln Laboratory Journal 20.2 (2014): 36-51.

(Continued)

*Primary Examiner* — Luke D Ratcliffe

(74) *Attorney, Agent, or Firm* — Sand, Sebolt & Wernow LPA; Scott J. Asmus

(57) ABSTRACT

An active receiver having a digital-pixel focal plane array (DFPA) ranges a target when observing return pulses from a pulsed laser beam synced with the receiver. The DFPA establishes a time when the pulsed laser beam contacts a target and the range can then be established because the speed at which the laser beam travels is known. Various basis functions may be implemented with the DFPA data to establish when the laser beam contacts the target. Some exemplary basis functions are binary basis functions, and other exemplary basis functions are Fourier basis functions.

16 Claims, 11 Drawing Sheets

(56) References Cited

U.S. PATENT DOCUMENTS

| | | |
|---|---|---|
| 8,692,176 B2 | 4/2014 | Kelly |
| 8,736,847 B2 | 5/2014 | Shirley |
| 8,933,832 B2 | 1/2015 | Kelly |
| 9,159,446 B2 | 10/2015 | Schultz |
| 9,198,578 B2 | 12/2015 | Zuzak |
| 9,270,895 B2 | 2/2016 | Kelly |
| 9,385,738 B2 | 7/2016 | Kelly |
| 9,491,389 B2 | 11/2016 | Kelly |
| 9,514,378 B2 | 12/2016 | Armstrong-Crews |
| 2007/0075888 A1* | 4/2007 | Kelly ............... H03M 1/145 341/155 |
| 2009/0228159 A1* | 9/2009 | Flowers ............ F41G 7/226 701/3 |
| 2013/0296709 A1 | 11/2013 | Zuzak |
| 2013/0296710 A1 | 11/2013 | Zuzak |
| 2014/0160476 A1 | 6/2014 | Goyal |
| 2015/0148655 A1 | 5/2015 | Haupt |
| 2015/0381183 A1 | 12/2015 | Schultz |
| 2016/0134821 A1 | 5/2016 | Kelly |
| 2018/0209765 A1* | 7/2018 | Titus ............... F41G 7/26 |
| 2018/0299554 A1* | 10/2018 | Van Dyck ........... G01S 17/10 |

FOREIGN PATENT DOCUMENTS

| | | |
|---|---|---|
| WO | 2013006188 A1 | 1/2013 |
| WO | 2014088590 A1 | 6/2014 |
| WO | 2015016991 A1 | 2/2015 |
| WO | 2015077088 A1 | 5/2015 |
| WO | 2015148604 A1 | 10/2015 |

OTHER PUBLICATIONS

Tyrrell, Brian, et al. "Time delay integration and in-pixel spatiotemporal filtering using a nanoscale digital CMOS focal plane readout." IEEE Transactions on electron Devices 56.11 (2009): 2516-2523.

\* cited by examiner

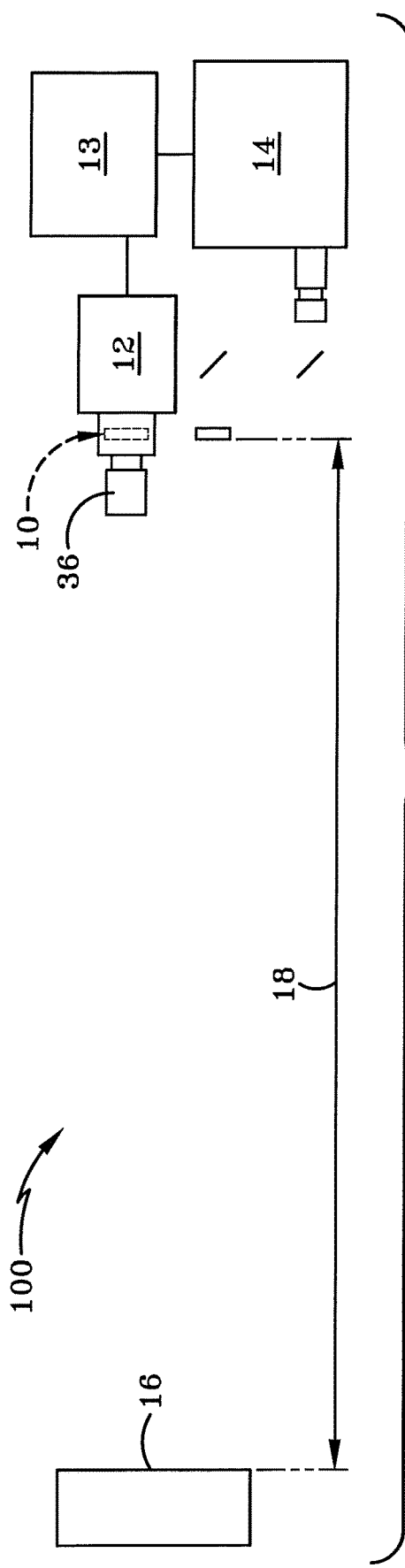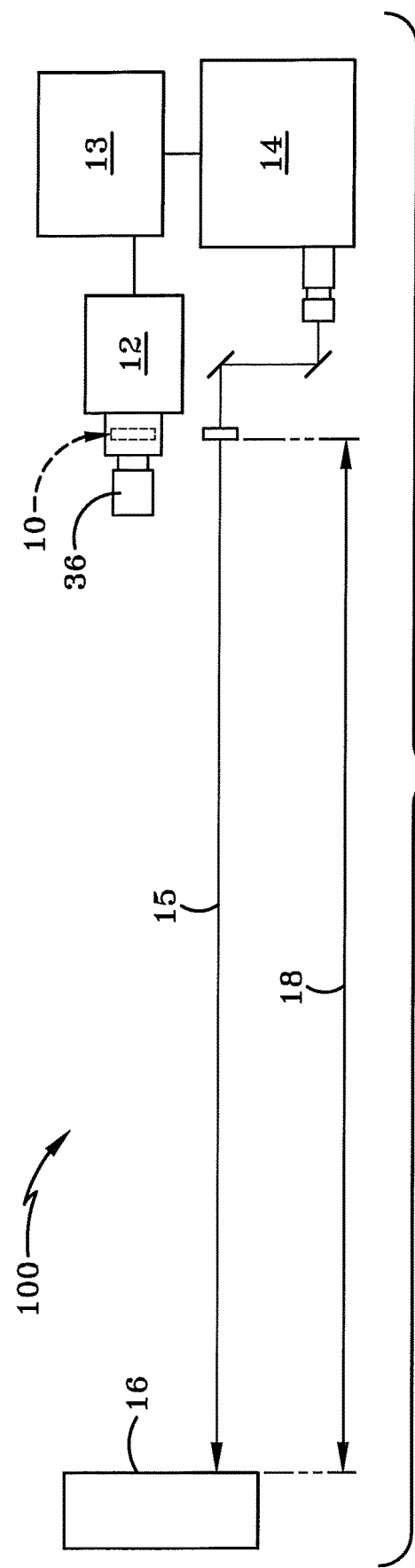

SYSTEM AND METHOD FOR RANGING A TARGET WITH A DIGITAL-PIXEL FOCAL PLANE ARRAY

BACKGROUND

Technical Field

The present disclosure relates generally to determining a distance from a target from an object (i.e., ranging). More particularly, the present disclosure relates to ranging a target with a pulsed laser beam received in a receiver integrated with a digital-pixel focal plane array.

Background Information

Focal plane array (FPA) applications typically require wide-area coverage, high signal-to-noise-ratios (SNR), high spatial resolution, and high frame rates in various combinations, amongst other requirements. Conventional FPAs are not particularly well-suited to satisfying combinations of the above requirements. Conventional FPAs typically provide analog readouts, with the analog signals generated at the pixel level converted to digital signals "off chip." Once converted off-chip, the digital signals may be processed according to the demands of a particular application. Specific analog designs can target (and possibly satisfy) one or more requirement, but may fail when targeting other requirements, such as requirements required for laser ranging using active receivers.

FPA(s) have limitations on achievable well depth (with concomitant limitations on capacitor size), and the readout noise floor, limit practical scalability of conventional designs. Capacitor size limitations require unnecessarily high frame rates to avoid saturating pixels. Electronics noise and ringing limit the amount of data that can be transmitted on a single output tap to maintain the needed SNR and dynamic range. Attempting to scale conventional analog technology to meet the most demanding requirements leads to a high-power-consumption FPA with many data output taps. This in turn leads to a large, massive, and complex sensor system. A compact focal plane array that provides internal processing would therefore be highly desirable.

Another frequent demand is the ability to integrate real-time, high pixel-count, image-based sensor systems into low size, weight, and power (SWaP) packages. However, the development of such low-SWaP, high-performance sensor systems is challenging conventional FPA technologies, which have limited data rate, dynamic range, and on-chip processing capabilities. While conventional technologies perform well in limited circumstance, scaling the technologies to meet emerging demands is difficult and results in large, complex, expensive systems.

A digital-pixel focal plane array (DFPA) is a recent advancement that has improved upon previously known analog FPA(s). Typically, DFPAs include a digital readout integrated circuit in combination with a detector array. The readout circuit includes unit cell electronics, orthogonal transfer structures, and data handling structures. The detector array converts incident photons to an electrically detectable signal. Typically, each unit cell includes an analog-to-digital converter (ADC). The ADC allows for various counting/converting schemes. The DFPA also enables orthogonal data transfer structure includes shift registers configured to shift conversion data among the various unit cells (for signal processing functions) or off the array (for readout).

SUMMARY

A need continues to exist to expand the application of DFPA(s). One exemplary need is in the field of ranging, more particularly pulsed laser ranging to determine the distance of a target from the laser. The present disclosure addresses this need, amongst other issues.

In one example, the present disclosure may provide a system for ranging a target comprising: a pulsed laser configured to produce a pulsed laser beam; a digital-pixel focal plane array (DFPA) in operative communication with the pulsed laser for detecting pulses of the pulsed laser beam; at least one non-transitory computer readable storage medium having instructions encoded thereon that, when executed by one or more processors, result in the following operations for ranging the target with the digital focal plane array determining the pulses from the pulsed laser, the operations configured to: (a) sync the pulsed laser beam with DFPA; (b) emit the pulsed laser beam from the pulsed laser towards the target at a location to which a range from the pulsed laser to the target is to be determined; (c) determine in the DFPA a time at which the pulsed laser beam returns from the target; and (d) range the target relative to the pulsed laser based on the time at which the DFPA determined the pulsed laser beam returned from the target and the speed at which the pulsed laser beam traveled. In this example, or another example, the DFPA may include a transimpedance amplifier configured to reduce pulse stretching and non-linear saturation.

In this example, or another example, the operations may be further configured to sample at least one basis function over an integration time to determine when the laser pulse contacted the target. In this example, or another example, the operations may be further configured to activate a receiver carrying the DFPA for a first time period after the pulsed laser was emitted from the pulsed laser. In this example, or another example, the operations may be further configured to receive pulsed laser return feedback from the target in the DFPA. In this example, or another example, the operations may be further configured to identify a return signal alternating between a count up and a countdown feature in the DFPA, wherein when response signal alternates from the count up feature to the countdown feature identifies a time the when the pulsed laser contacted the target, and when the time at which the pulsed laser beam contacts the target is coupled with the speed of the laser beam to range the target. In this example, or another example, the operations may be further configured to take multiple images with a receiver incorporating the DFPA; and change a sampling function over multiple images to find the range of the target. In this example, or another example, the operations may be further configured to receive photo current in a bi-directional counter on the DFPA; and interpret in the counter whether the photo current is a positive pulse or a negative pulse, wherein if the photo current is a positive pulse, then the photo current occurred in a first window of time, and wherein if the photo current is a negative pulse, then the photo current occurred in a different second window of time; and determine, in the DFPA, a time when photo current switches from a positive pulse to a negative pulse, or vice versa; and range the target based on the time when the DFPA determined the photo current switched and the pulsed laser beam speed.

In this example, or another example, the operations may be further configured to localize when the pulsed laser returned from the target to establish a return time. In this example, or another example, the operations may be further configured to dither the pulsed laser beam to reduce non-linear saturation of a return signal. In this example, or another example, the operations may be further configured to establish a set of initial guesses of the location of the target to reduce a number of basis functions needed to range the target. In this example, or another example, the operations may be further configured to use a basis function with a sine wave function adapted to reduce noise.

In another aspect, the present disclosure may provide a method comprising: syncing a pulsed laser beam with a digital-pixel focal plane array (DFPA); emitting the pulsed laser beam from a pulsed laser towards a target at a location to which a range from the pulsed laser to the target is to be determined; determining in the DFPA a time at which the pulsed laser beam returns from the target; and ranging the target relative to the pulsed laser based at least in part on the time at which the DFPA determined the pulsed laser beam returned from the target and the speed at which the pulsed laser beam traveled. This example or another example may further provide identifying a return signal alternating between a count up and a countdown feature in the DFPA, wherein when the return signal alternates from the count up feature to the countdown feature identifies a time the when the pulsed laser contacted the target, and when the time at which the pulsed laser beam contacts the target is coupled with the speed of the laser beam to range the target. This example or another example may further provide receiving photo current in a bi-directional counter on the DFPA; interpreting in the counter whether the photo current is a positive pulse or a negative pulse, wherein if the photo current is a positive pulse, then the photo current occurred in a first window of time, and wherein if the photo current is a negative pulse, then the photo current occurred in a different second window of time; determining, in the DFPA, a time when photo current switches from the positive pulse to the negative pulse, or vice versa; ranging the target based on the time when the DFPA determined the photo current switched and the pulsed laser beam speed. This example or another example may further provide localizing when the pulsed laser returned from the target to establish a return time. This example or another example may further provide reducing reduce pulse stretching and non-linear saturation with a transimpedance amplifier in the DFPA.

In another aspect, the present disclosure may provide an active receiver having a digital-pixel focal plane array (DFPA) that ranges a target when observing return pulses from a pulsed laser beam synced with the receiver. The DFPA establishes a time when the pulsed laser beam contacts a target and the range can then be established because the speed at which the laser beam travels is known. Various basis functions may be implemented with the DFPA data to establish when the laser beam contacts the target. Some exemplary basis functions are binary basis functions, and other exemplary basis functions are Fourier basis functions.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A is a schematic view of a ranging system with a DFPA in accordance with the present disclosure.

FIG. 2B is an operation schematic view of the ranging system with the DFPA.

Similar numbers refer to similar parts throughout the drawings.

DETAILED DESCRIPTION

By way of additional information, a DFPA takes advantage of a digital readout integration circuit (DROIC) to perform in-pixel signal digitization. The DFPA enables a larger dynamic range, faster low-noise all-digital readout, and on-chip processing for reduced sensor size, weight, and power (SWaP) and for the development of novel sensing modalities. The technical approach enables sub-20 μm pitch, low-power designs by employing simple, compact circuits, such as low-power analog-to-digital conversion circuits, as well as low-power counters and shift registers.

Figure 1:
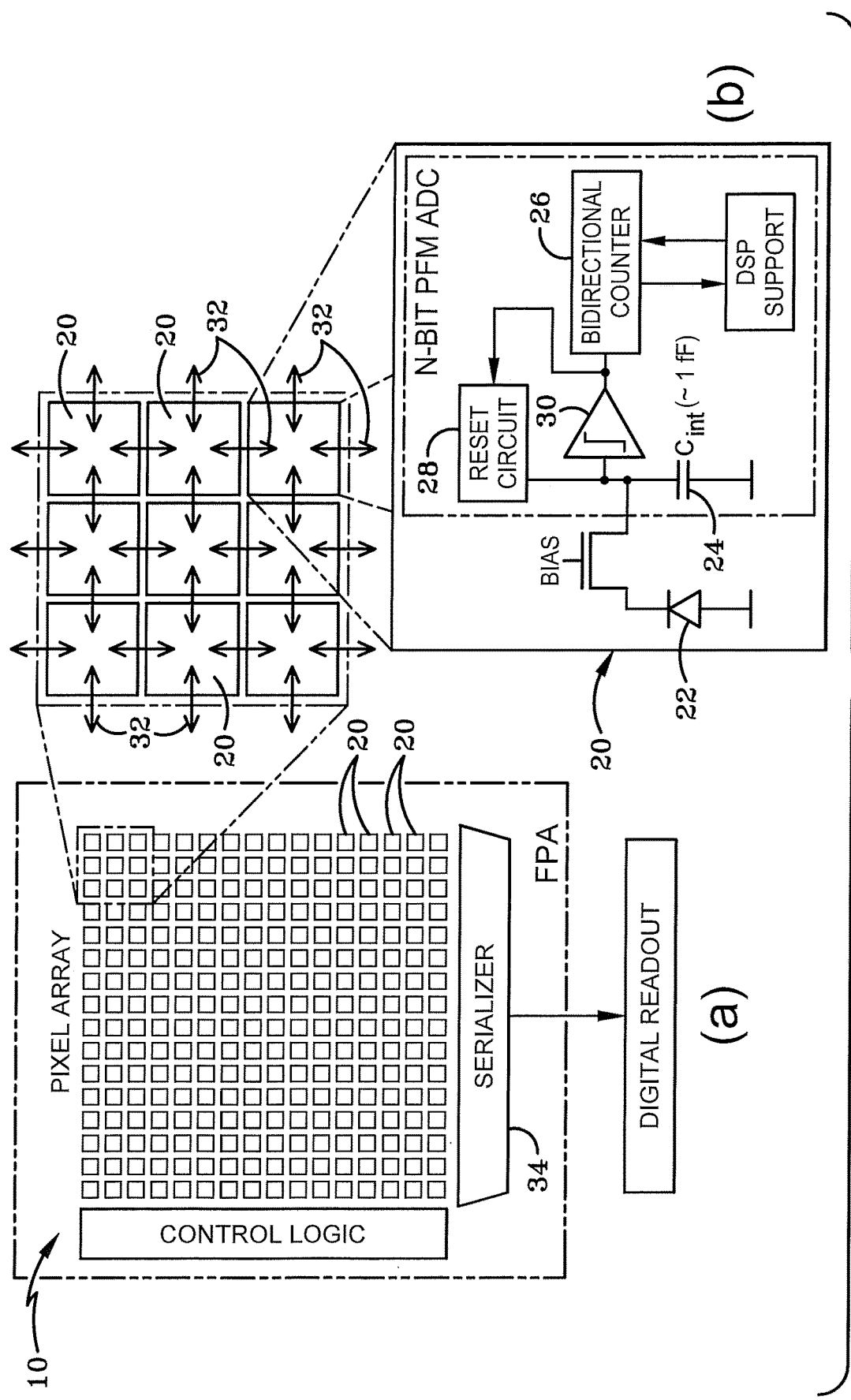
FIG. 1 is a diagrammatic representation of a digital-pixel focal plane array (DFPA).

FIG. 1 depicts portion (a) and portion (b), wherein portion (a) is a digital readout integration circuit (DROIC) architecture and portion (b) is a simplified unit-cell. The simplified unit-cell 20 includes an injection transistor 22 that feeds a small integrating capacitor 24 (about 1 femtofarad) corresponding to an electron well of an about 6000 electrons at a maximum of 1 volt across the integrating capacitor. As will be described below, when the capacitor 24 well fills, the integrating capacitor charge is reset and a pulse is generated. This generated pulse results in in a pulse train with a frequency proportional to the input photocurrent. Each pulse incrementing or decrementing a counter 26. Thereafter, digital signal processing techniques are applied during signal integration. When the shutter on a camera/receiver is closed, the counter represents the total number of times the capacitor 24 electron well filled. Thus, since the size of the capacitor electron well is known, the counter 26 digitally represents the number of integrated photoelectrons.

The DROIC includes a preamplifier/buffer, an in-pixel analog-to-digital converter consisting of a photocurrent-to-frequency converter (I-to-F converter) circuit connected to a counter/shift register, multiplexors to connect the counter/shift register to one of four nearest-neighbor unit cells, and pixel timing and control circuits.

The DROIC unit-cell cell 20 is configurable to meet various application needs of the user. Some exemplary configuration of the DROIC unit-cell include a conversion gain, which is equivalent to the least significant bit (LSB) of the digitization process, of the I-to-F converter can be adjusted (i.e., the frequency for a given input current can be adjusted) to maximize the electronic well depth (maximum value of LSB) or minimize quantization noise (minimum value of LSB). Another exemplary configuration of the DROIC unit-cell 20 includes that the counter/shift register may be preset to any value and can be configured to increment or decrement the register contents. Another exemplary configuration of the DROIC unit-cell includes that the counter may be reconfigured as a shift register. Another exemplary configuration of the DROIC unit-cell includes that the multiplexor can be configured to connect the register contents into any one of four nearest-neighbor unit cells. The counter can be partitioned into two independently controlled counters, i.e., each counter can be independently controlled to increment or decrement the I-to-F output pulse train.

A preamplifier (direct-injection transistor) isolates the detector bias from the unit-cell circuits. The buffered photocurrent is then applied to a small (parasitic) integrating capacitance ($C_{int}$) of approximately 1 femtofarad, which corresponds to a maximum charge bucket of approximately 6000 photoelectrons assuming a maximum of 1 volt across $C_{int}$. Note, this is significantly less than an analog unit cell which typically has a full well capacity of 25 million photoelectrons. As the charge bucket fills, the voltage V across $C_{int}$ increases as $\Delta V = \Delta Q/C_{int}$, where $\Delta Q$ is the change in the current Q. When the voltage V reaches a present threshold, a comparator circuit is tripped. The output of the comparator 30 is fed to a circuit 28 that resets the voltage across the integrating capacitor and a pulse-generation circuit that is input to an N-bit digital counter.

Prior to the opening of an electronic shutter in a camera/receiver, the unit cell is configured by presetting the counter 26 to an initial value and programmed to increment its contents with each input pulse from computer 30, and the integrating capacitor 24 is reset. When the shutter opens, the small integrating capacitor 24 fills at a rate proportional to the photocurrent which itself is proportional to the in-band light incident on the detector, and the progression of charging and resetting generates a pulse train whose frequency is proportional to the photocurrent. The pulse train is input to the N-bit counter 26, which then increments (or decrements) its contents with each pulse until the shutter is closed, at which point the contents of the counter 26 represent a "digital" well with total integrated photoelectrons equal to the product of the digital count and the (known) well capacity. Additionally, the counter can be configured to increment or decrement pulses independent of the shutter time (i.e., total signal integration time). This is accomplished by alternating between increment and decrement modes so as to allow the DFPA to AC couple the input signal. In this way, the photocharge on the integrating capacitor can be interpreted as the charge associated with a single digital count, i.e., the least significant bit of the digital counter. The quantization noise associated with the analog-to-digital conversion process is given by:

$$\text{Quantization Noise} = \sqrt{LSB/12} = \sqrt{Q/12}$$

where $Q=(V_t-V_{dd}) \times C_{int}$ is the effective well size (in electrons), $C_{int}$ is the integrating capacitor, $V_t$ is the comparator voltage threshold, and $V_{dd}$ sets the initial voltage across the integrating capacitor. The digital signal is then routed to one of four neighboring pixels, as collectively shown by arrows 32, (based on the initial unit-cell configuration) and noiselessly shifted at high speed. Serializer circuits 34 located at the edge of the array stream data onto high-speed (nominal 2 Gbps) line drivers.

Typical DFPA operations provide a controllable integration time, an up and down counting, and an orthogonal transfer enable the compact, low-power implementation of both spatial and simple temporal filtering operations. On-chip filtering offers the potential for new imaging modalities and extremely low-SWaP sensor systems for image exploitation.

The temporal filtering operation may be based on differencing successive images implemented with the DFPA 10. The counter 26 is programmed to first increment pulses and next, before image readout, decrement the incoming pulse train, and then read out the difference between the successively collected images. As described below, only areas in the scene that have changing signal, caused by object motion or signal modulation, produce a signature in the resulting image.

In the PRIOR ART, fast temporal filtering has been utilized with a DFPA to detect the tract of a bullet in flight by sequentially collecting many image differences prior to data readout. In an experiment conducted by the MIT Lincoln Laboratory, located in Lexington, Mass. (the Lincoln Labs example), a shooter is firing a pistol within a 50-foot range from the DFPA imager. The Lincoln Labs example is detailed further in the paper by Schultz, Kenneth I., et al. "Digital-pixel focal plane array technology." *Lincoln Laboratory Journal* 20.2 (2014): 36-51, the entirety of which is incorporated by reference as if fully rewritten herein. In the Lincoln Labs example, the DFPA created a single raw image of the highlighted field of view showing a bullet fired at a speed of approximately 350 meters per second. In the Lincoln Labs example, the DFPA was programmed to collect 40 consecutive 200 µs integration periods prior to readout. The counter was configured to alternate between up and down counting intervals. After this 8 ms total integration time, the frame was read out, and the process was repeated. In this way, high-frequency events (e.g., a period <200 µs) can be captured while reading out at a rate 40 times slower than the high frequency of interest. Furthermore, the Lincoln Labs example utilized high-speed, in-pixel processing to remove stationary clutter from the bullet trajectory image while retaining the signal of interest (i.e., the bullet trajectory). Fast-moving objects, such as the bullet and the muzzle flash (hot gases escaping the gun barrel), produce white and black striped patterns (i.e., a Zebra pattern (informally)); the in-pixel presence of the bullet while up counting and down counting results in alternating white and black stripes, respectively. Stationary and slowly moving objects, such as the gun barrel, are not detected. The in-pixel filtering allows "clean" imagery of the bullet trajectory to be read out at data rates between one and two orders of magnitude lower than what would be required using conventional imagers.

FIG. 2A depicts a system for ranging a target with a digital-pixel focal plane array generally at 100. System 100 includes a digital-pixel focal plane array 10 carried by a receiver 12, a laser 14, at least one computer readable storage medium 13, and a target 16 spaced apart from the laser 14 and receiver 12 by a distance 18. The distance 18 may also be referred to as the range of target 16 relative to receiver 12 and laser 14. More particularly, range 18 is the distance from the receiver carrying the DFPA 10 and the laser 14 to the target 16. The DFPA 10 and the laser 14 are positioned closely to each other.

Receiver 12, in one example, may be a mid-wave infrared (MWIR) receiver or camera including an avalanche photodiode (APD) in operative communication with DFPA 10. The APD is a semiconductor exploiting the photoelectric effect to convert light to electricity. One exemplary receiver 12 is manufactured by DRS Technologies of Arlington, Va. It is to be understood that while a MWIR receiver is utilized in one example, a receiver operating in any other optical band is entirely possible.

Receiver 12 has a lens 36 that operates at a shutter speed. Notably, Digital cameras do not use mechanical shutters in the sense that old film (and DSLR) cameras do. Light is always incident on the DFPA, any "shutter" signal is handled electronically. In one particular example, the lens 36 is a 100 mm lens with approximately 30 microradians (prad) IFOV. Furthermore, the lens has approximately 100 microseconds (µsec) total window. Shuttering is performed electronically on the DFPA 10.

Laser 14 is operatively connected with the DFPA 10. In one particular example, laser 14 operates in response to the digital shutter opening on the lens 36 of the receiver 12 (recall, light is always incident on the DFPA, any "shutter" signal is handled electronically). In another example, the shutter of the lens 36 opens in response to a laser beam 15 generation and transmission from laser 14 (recall, Light is always incident on the DFPA, any "shutter" signal is handled electronically). In one particular example, the laser 14 is a MWIR laser. An exemplary laser is manufactured by BAE Systems PLC. One example provides a pulsed laser with a 20 microjule/pulse (µj/pulse).

The target 16 can be of any known or unknown shape provided that it enables some reflectivity to be viewed by the receiver 12 as the pulsed laser beam generated from laser 14 impacts the target 16. It is to be understood that in an experimental nature, the target 16 is a Styrofoam block. However, the technology of system 100 may be expanded such that the target 16 can be of any known shape or material. Thus, the receiver 12 having the DFPA 10 in combination with the laser 14 may be implemented in various scenarios where it is desirable to range a target. Exemplary scenarios may include battle field operations or aviation environments. However, it is to be clearly understood that other scenarios are entirely possible and within the scope of the present disclosure.

FIG. 2B depicts the operation of system 100. Particularly, the pulsed laser 14 generates a pulsed laser beam 15. System 100 enables the distance or range 18 to be determined. Determining the distance 18 is accomplished by measuring the time (often in microseconds or less) it took for the DFPA 10 to detect a return of pulsed beam 15 because it bounced off the target 16. Inasmuch as the pulsed beam 15 travels at approximately the speed of light (about 300,000 km/s [roughly 186,000 miles a second or about 1 foot per nanosecond]), the system may implement ranging logic run on a computer to calculate the time it took for the DFPA 10 to observe the beam return. This should be able to calculate the time within 1 nanosecond of resolution to determine the distance 18 of the target 16. The ranging calculation may be accomplished by the computer in communication with the at least one non-transitory computer readable storage medium 13 having instructions encoded thereon that, when executed by one or more processors, result in the following operations for ranging the target 16 with the DFPA 10 determining the pulses from the pulsed laser 14, the operations comprising: (a) syncing the pulsed laser beam 15 with the DFPA 10; (b) emitting the pulsed laser beam 15 from the pulsed laser 14 towards the target 16 at a location to which a range 18 from the pulsed laser to the target is to be determined; (c) determining in the DFPA 10 a time at which the pulsed laser beam 15 returns from the target 16; and (d) ranging the target 16 relative to the pulsed laser based on the time at which the DFPA 10 determined the pulsed laser beam returned from the target 16 and the speed at which the pulsed laser beam traveled (i.e., the speed of light).

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

With continued reference to FIG. 2B, the speed at which the laser travels requires improvements over existing conventional uses of DFPA technology. In conventional systems, when a DFPA is utilized to measure a fast moving object that is still significantly slower than the speed of light (i.e., such as a bullet), the DFPA will register multiple measurements in one frame. Thus, it is typical for a Zebra pattern (i.e., alternative black and white lines) to be established. However, system 100 utilizes ranging logic executing a series of sampling basis functions (shown in FIG.

Figure 4A:
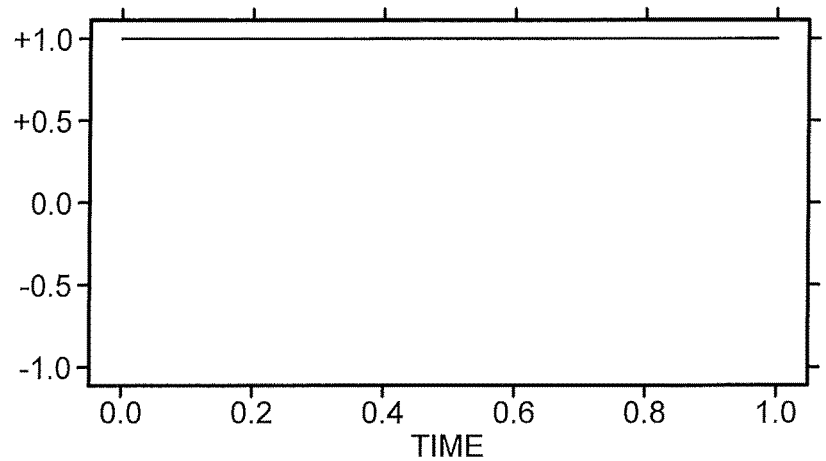
FIG. 4A is a generic graph of a square wave approximations to Fourier basis functions with a frequency of 0.
Figure 4B:
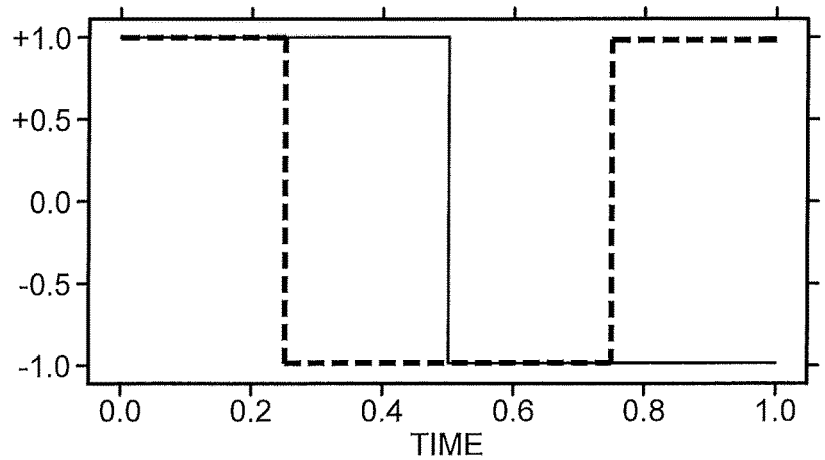
FIG. 4B is a generic graph of a square wave approximations to Fourier basis functions with a frequency of 1.
Figure 4C:
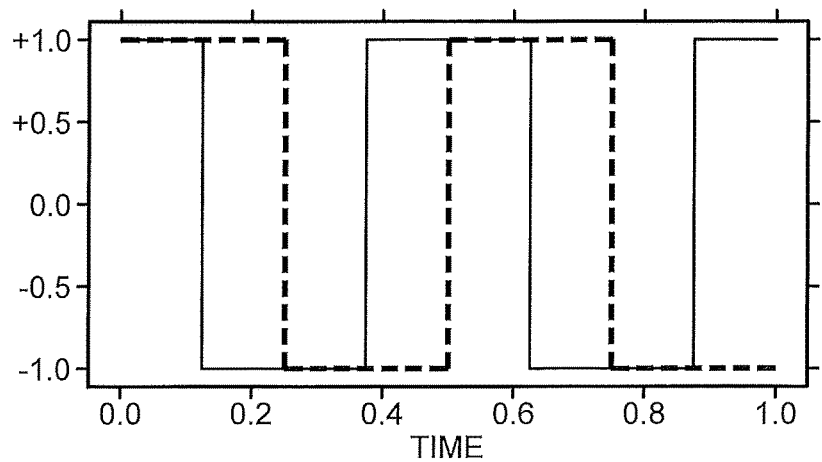
FIG. 4C is a generic graph of a square wave approximations to Fourier basis functions with a frequency of 2.
Figure 4D:
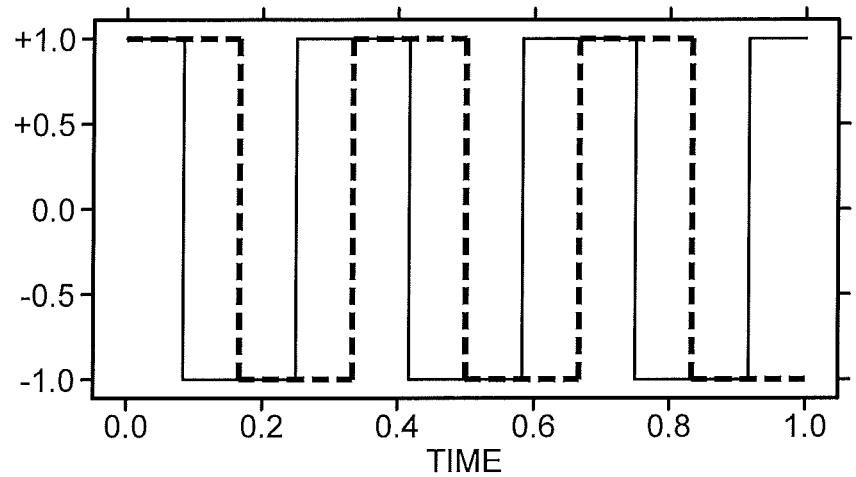
FIG. 4D is a generic graph of a square wave approximation to Fourier basis functions with a frequency of 3.
Figure 4E:
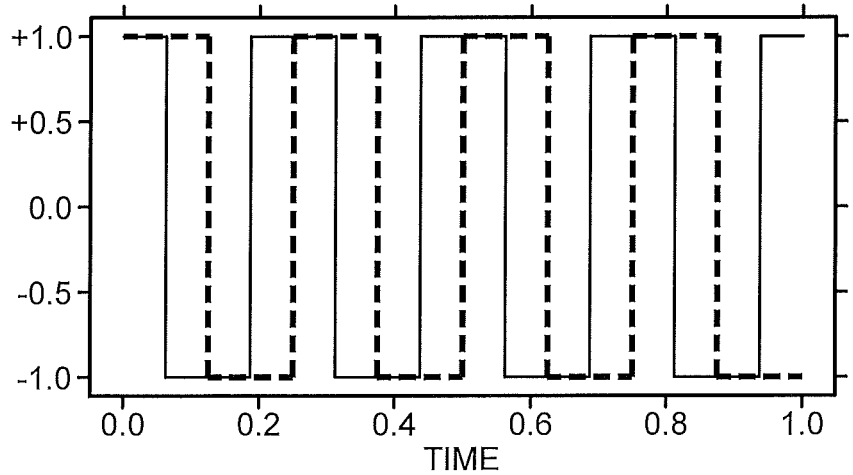
FIG. 4E is a generic graph of a square wave approximations to Fourier basis functions with a frequency of 4.

3A-FIG. 4E) to determine internally when in the laser pulse returned from the target 16 over a larger integration time.

To collect the images, the start time of the camera must first be slaved to the laser 14. More particularly, the receiver 12 is slaved (i.e., dependently synced) to when the pulsed laser beam 15 is transmitted from laser 14. The slaving of the receiver 12 to the laser 14 establishes that the counter 26 in the DFPA 10 will start counting when the pulsed laser beam 15 begins emitting towards target 16. Alternatively, the laser 14 could be slaved to the receiver 12 such that when the shutter on receiver 12 opens and begins observing, at that time the laser beam 15 is generated and emitted. Then, based on when the DFPA observed to return or feedback pulses, the ranging logic can determine a round trip time for the pulsed laser beam 15. Then, the roundtrip laser beam time can be used to determine the range distance 18 of target 16. In one example, the distance 18 equals rate (i.e., speed of light) multiplied by the travel time (roundtrip time divided by 2).

Figure 3A:
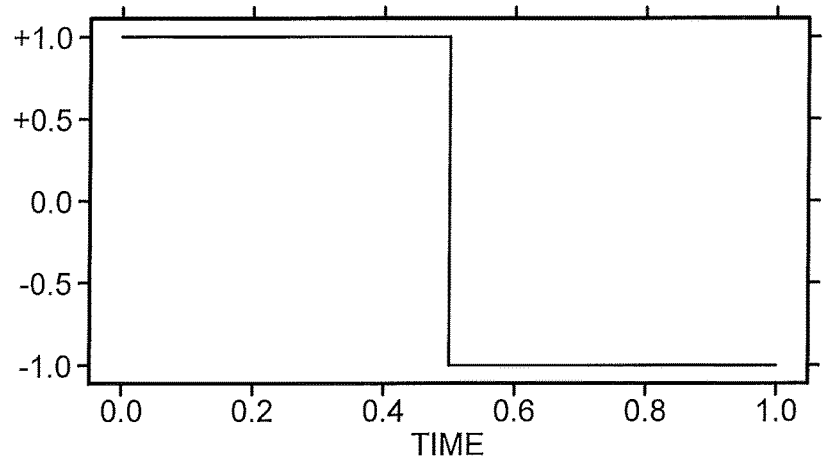
FIG. 3A is a generic graph of a binary basis function with a frequency of 2.
Figure 3B:
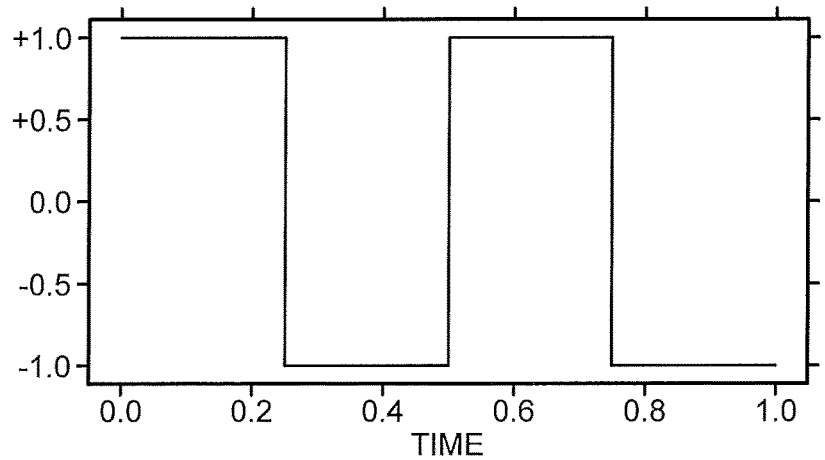
FIG. 3B is a generic graph of a binary basis function with a frequency of 4.
Figure 3C:
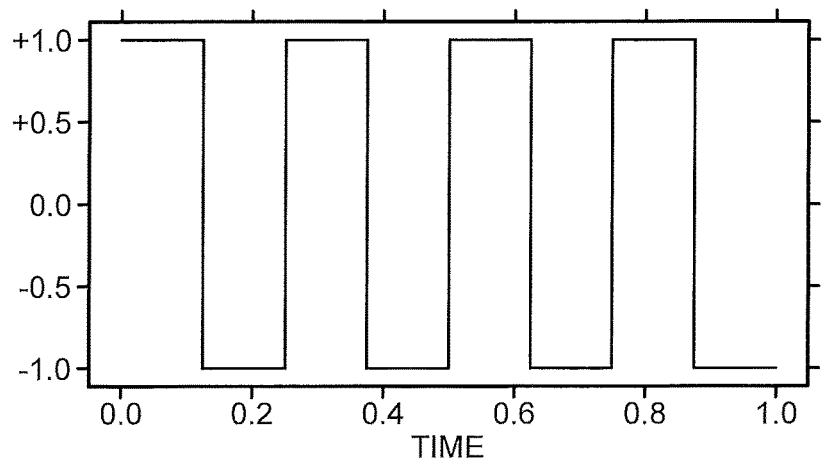
FIG. 3C is a generic graph of a binary basis function with a frequency of 8.
Figure 3D:
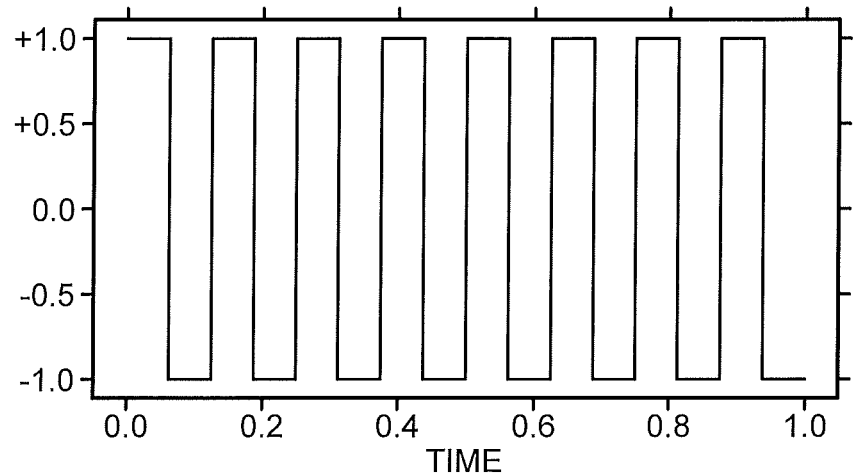
FIG. 3D is a generic graph of a binary basis function with a frequency of 16.
Figure 3E:
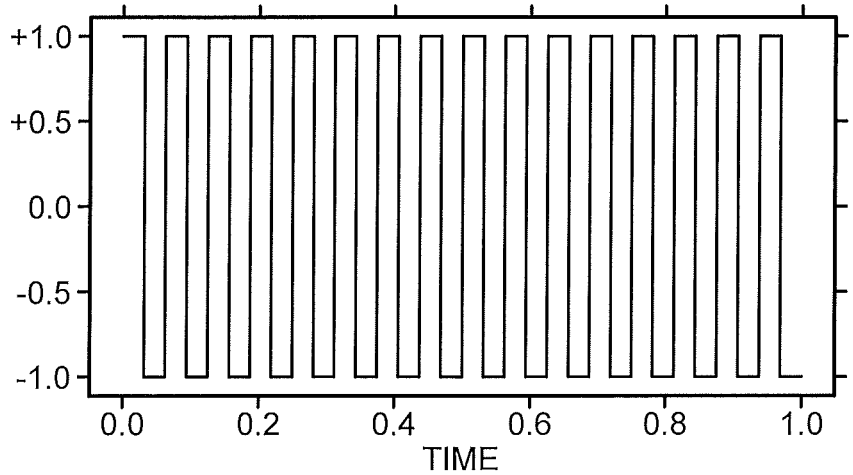
FIG. 3E is a generic graph of a binary basis function with a frequency of 32.

FIG. 3A, FIG. 3B, FIG. 3C, FIG. 3D, and FIG. 3E are square-wave graphs representing five different binary sampling functions for the counter of the DFPA (i.e., binary basis functions). Recall, the counter of the DFPA 10 enables sampling in the frequency domain. Thus, time domain signals are developed from orthogonal basis functions. The square-wave graphs of FIG. 3A, FIG. 3B, FIG. 3C, FIG. 3D, and FIG. 3E have frequencies of 2^N multiples of sampling window. In FIG. 3A, N=1; in FIG. 3B, N=2; in FIG. 3C, N=3, in FIG. 3D, N=4; and in FIG. 3E, N=5. In each graph the y-axis of the square wave represents the positive (+1) and the negative (−1) values of the register at a certain time (x-axis).

FIG. 4A, FIG. 4B, FIG. 4C, FIG. 4D, and FIG. 4E are square wave transform graphs with a Fourier basis set (i.e., Fourier basis functions). The square waves have frequency integer multiples of sampling windows. FIG. 4A, FIG. 4B, FIG. 4C, FIG. 4D, and FIG. 4E depict the first five I and Q basis functions. FIG. 4A is the first I and Q basis function. FIG. 4B is the second I and Q basis function. FIG. 4C is the third I and Q basis function. FIG. 4D is the fourth I and Q basis function. FIG. 4E is the fifth I and Q basis function.

The sampling function creates a binary digital representation of locates when the pulse is observed by the DFPA 10 in the receiver 12. In one example, each image that is taken by receiver 12 (i.e., the camera) analyzed with a sampling function (such as the ones presented in FIG. 3A-FIG. 4E). Then, the collection of images analyzed with a sampling function are evaluated to localize when (i.e., at what time) the pulsed laser beam happened or when it returned from the target.

The various sampling functions identified in FIG. 3A-FIG. 4E are used in conjunction with the DFPA 10 to perform range gated laser ranging. As the pulsed laser beam 15 is sent down range, the receiver 12 (or camera) may be activated for a time interval. Then ranging logic determines whether a return pulse was received in that time interval. In one example, the range may be determined by changing the sampling function (a plurality of different sampling functions shown in FIG. 3A-FIG. 4E) over multiple images. The receiver 12 takes multiple images using sampling functions, such as the ones depicted in FIG. 3A-FIG. 4E. In one example, the I and Q basis functions (FIG. 4A-FIG. 4E) are more robust, but the square wave basis function of FIG. 3A-FIG. 3E are also correct. For example, if the basis function is implemented (which is a type of digital filter) shown in FIG. 3A, the counter 26 of DFPA 10 will count up (i.e., count positive +1) for the first half of the time frame, then count down (i.e., count negative −1) for the second half of the time frame. If the return pulse is indicated as positive, then the ranging logic determines that the return pulse occurred in the first half of the time frame. This establishes that the laser pulse was detected in the first half of the integration time window. If the return pulse is indicated as negative, then the ranging logic determines that the return pulse occurred in the second half of the time frame. This establishes that the laser pulse was detected in the second half of the integration time window.

The binary basis functions of FIG. 3A-FIG. 3E carry implicit assumptions. The binary basis functions assume that a single detection is in every frame. However, in actual implementation, if the laser return is weak, then it might not be possible to make a detection for any given image. To combat this, the Fourier basis functions may be utilized. The Fourier basis functions of FIG. 4A-FIG. 4E can reconstruct a time signal from multiple noisy Fourier measurements. This is accomplished by performing Fourier transforms of the images. The that Fourier basis functions of FIG. 4A-FIG. 4E offer more noise immunity and better performance when there are low signal-to-noise (SNR) returns.

With continued reference to FIG. 4A-FIG. 4E, when reconstructing a single pixel, two measurements are preferred at once. A first measurement is a real measurement (shown as a solid line) and a second measurement is a mathematically imaginary measurement (shown as a dashed line). Thus, the Fourier basis functions have a single complex coefficient that is generated for every pixel on the DFPA 10, for every image that is taken. That complex coefficient is then multiplied by the Fourier basis function to generate a resultant image. Over time, a plurality of resultant images are generated and summed.

Figure 5:
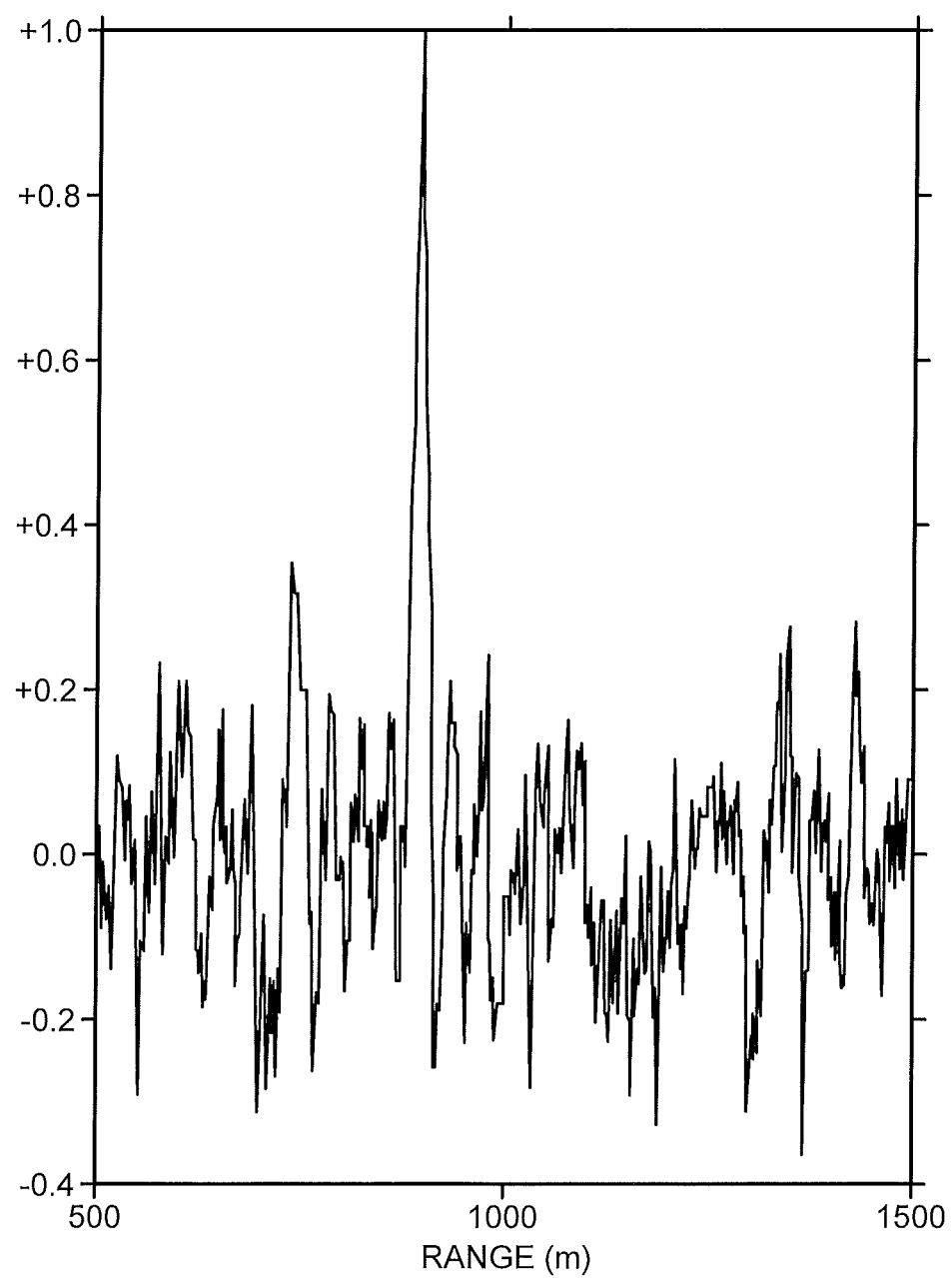
FIG. 5 is a graph of basis simulation summing 30 pulses utilizing Fourier basis functions with both I&Q.

FIG. 5 is a graphical representation of the summation of the resultant images. FIG. 5 indicates that the same pixel from thirty has been summed. As the number of images from a single pixel is summed, the system gets progressively more time and/or range fidelity. As indicated, when summing thirty pixels, it is clear that the range or distance 18 of target 16 is about 800 m. It is to be understood that the generated results may be processed through this exemplary signal processing theory or other signal processing theories may be applied.

Figure 6A:
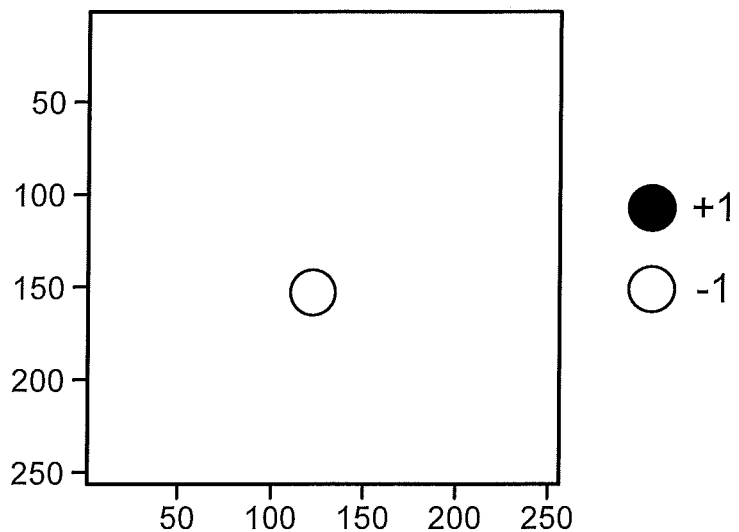
FIG. 6A is a diagrammatic graph representing the negative sign (phase) of a laser pulse relative to the sampling function for 1 cycle per integration.
Figure 6B:
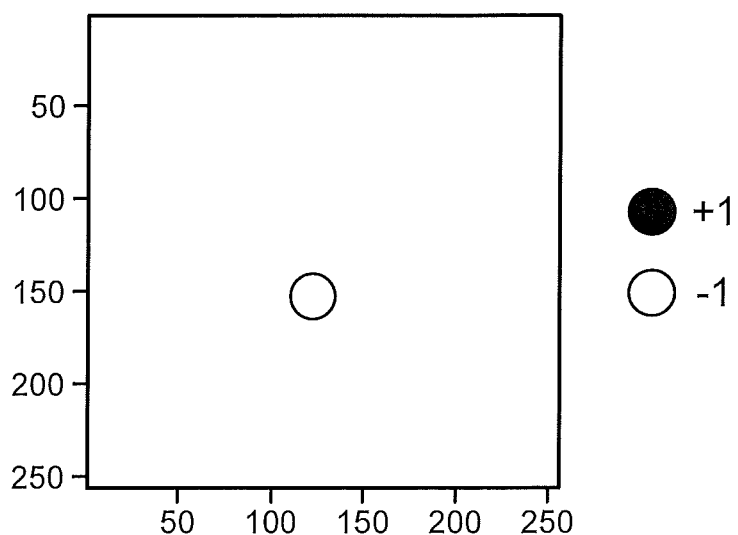
FIG. 6B is a diagrammatic graph representing the negative sign (phase) of a laser pulse relative to the sampling function for 2 cycles per integration.
Figure 6C:
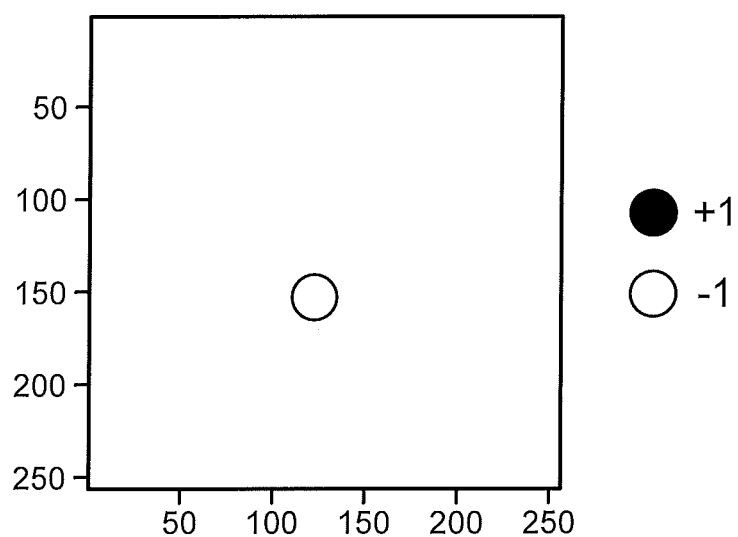
FIG. 6C is a diagrammatic graph representing the negative sign (phase) of a laser pulse relative to the sampling function for 4 cycles per integration.
Figure 6D:
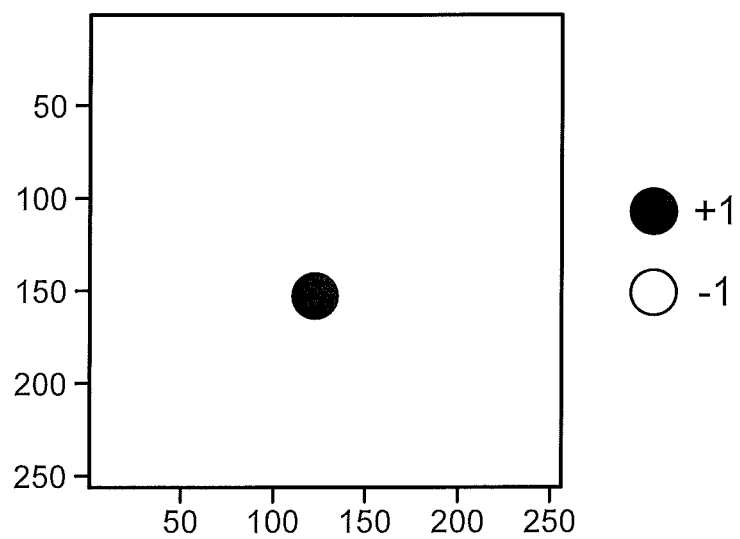
FIG. 6D is a diagrammatic graph representing the positive sign (phase) of a laser pulse relative to the sampling function for 8 cycles per integration.
Figure 6E:
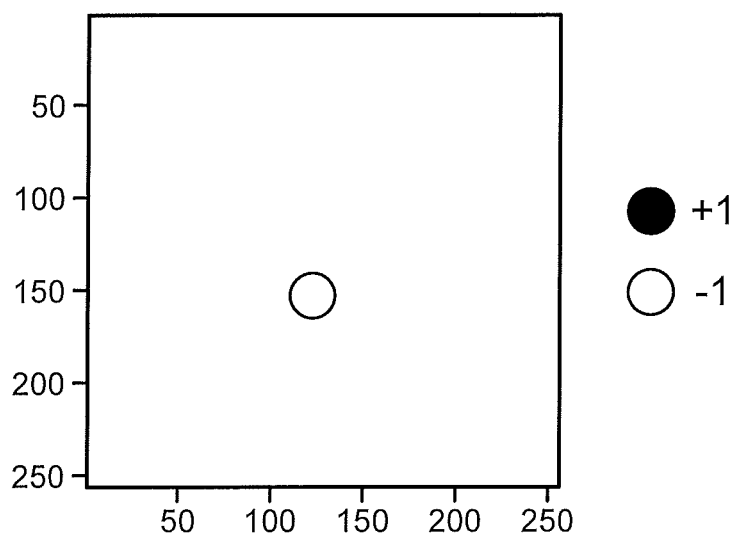
FIG. 6E is a diagrammatic graph representing the negative sign (phase) of a laser pulse relative to the sampling function for 16 cycles per integration.

FIG. 6A, FIG. 6B, FIG. 6C, FIG. 6D, and FIG. 6E are diagrammatic graphs representing the sign of a sampled function to indicate the phase of the laser pulse relative to the sampling function. The sign of the sampled function indicates the phase of the observed laser pulse returning from the target relative to the sampling function. FIG. 6A indicates one cycle per integration and the sign of the sampled function is negative (represented by the −1 shading). FIG. 6B indicates two cycles per integration and the sign of the sampled function is negative (represented by the −1 shading). FIG. 6C indicates four cycles per integration and the sign of the sampled function is negative (represented by the −1 shading). FIG. 6D indicates eight cycles per integration and the sign of the sampled function is positive (represented by the +1 shading). FIG. 6E indicates sixteen cycles per integration and the sign of the sampled function is negative (represented by the −1 shading).

When the laser pulse returns, it forms a general image point of view similar to what is seen in FIG. 6A-6E. In one example, the pulsed laser beam 15 is several pixels large. In another example, the pulsed laser beam is about ten pixels wide. The pixel registers to indicate that beam 15 has contacted target 16. Since the images are taken with the DFPA in the count up/count down mode the background features representing frequencies that do not change may get either filtered out or washed out by the receiver or its logic. FIG. 6D indicates that a positive laser beam return result was observed in the DFPA 10. Thus, the time at which the sign of the beam switching from negative to positive (i.e., from FIG. 6C to FIG. 6D), can be provided to the ranging logic to calculate the distance 18.

Figure 7:
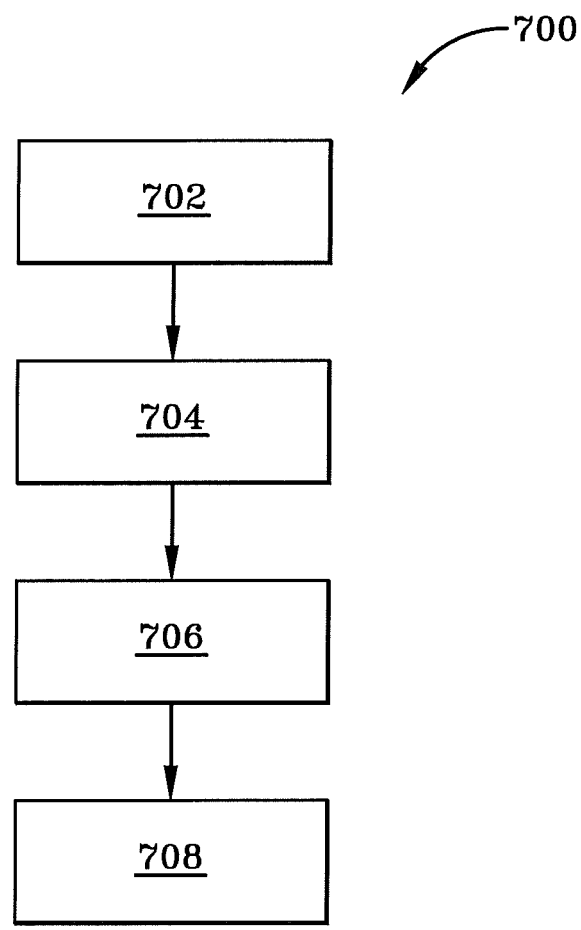
FIG. 7 is an exemplary flow chart of a method in accordance with the present disclosure.

FIG. 7 depicts an exemplary method in accordance with the present disclosure. In one example, a method of ranging a target with an active receiver having a DFPA 10 is shown generally at 10. Syncing the pulsed laser beam 15 with the DFPA is shown generally at 702. Emitting or transmitting the pulsed laser beam 15 from the pulsed laser 14 towards the target 16 at a location to which a range 18 from the pulsed laser 14 to the target 16 is to be determined is shown generally at 704. Determining in the DFPA 10 a time at which the pulsed laser beam 15 returns from the target 16 is shown generally at 706. Ranging the target 16 relative to the pulsed laser 14 based on the time at which the DFPA 10 determined the pulsed laser beam 15 returned from the target 16 and the speed at which the pulsed laser beam traveled is shown generally at 708.

As described the device allows the DFPA 10 to be used as a laser radar (LIDAR) and may be used for all applications in which a radar is useful. Particular applications considered are detecting and tracking optically retro-reflective systems and terrain or collision warning for vehicles. In one particular example, the basis functions disclosed herein should converge faster than traditional "gated" ranging functions in which a finite size window is delayed over progressive samples until a detection is made. The basis functions described herein are good for search functions. For example, a search function may be applied for searching for the range of a target relative to the DFPA 10 in retro-reflective systems and terrain or collision warning for vehicles Optimization for a tracking system may require different basis functions Also, various concepts may be exemplified as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment or example, to A only (optionally including elements other than B); in another embodiment or example, to B only (optionally including elements other than A); in yet another embodiment or example, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment or example, to at least one, optionally including more than one, A, with no B present (and optionally including elements other than B); in another embodiment or example, to at least one, optionally including more than one, B, with no A present (and optionally including elements other than A); in yet another embodiment or example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like such as "an example," means that a particular feature, structure, or characteristic described in connection with the embodiments is included in at least some embodiments or examples, but not necessarily all embodiments or examples, of the present disclosure. The various appearances "an example," "an embodiment," "one embodiment," "some embodiments," "one particular embodiment," or "other embodiments," or the like, are not necessarily all referring to the same embodiments or examples.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A system for ranging a target comprising:
a pulsed laser configured to generate a pulsed laser beam;
a digital-pixel focal plane array (DFPA) in operative communication with the pulsed laser for detecting pulses of the pulsed laser beam;
at least one non-transitory computer readable storage medium having instructions encoded thereon that, when executed by one or more processors, result in the following operations for ranging the target with the digital focal plane array determining the pulses from the pulsed laser, the operations configured to:
(a) sync the pulsed laser beam with DFPA;
(b) emit the pulsed laser beam from the pulsed laser towards the target at a location to which a range from the pulsed laser to the target is to be determined;
(c) determine in the DFPA a time at which the pulsed laser beam returns from the target;
(d) range the target relative to the pulsed laser based on the time at which the DFPA determined the pulsed laser beam returned from the target and the speed at which the pulsed laser beam traveled;
(e) receive photocurrent in a bi-directional counter on the DFPA;
(f) interpret in the counter whether the photocurrent is a positive pulse or a negative pulse, wherein if the photocurrent is a positive pulse, then the photocurrent occurred in a first window of time, and wherein if the photocurrent is a negative pulse, then the photocurrent occurred in a different second window of time;
(g) determine, in the DFPA, a time when photocurrent switches from a positive pulse to a negative pulse, or vice versa; and
(h) range the target based on the time when the DFPA determined the photocurrent switched and the pulsed laser beam speed.

2. The system of claim 1, further comprising:
a receiver, wherein the DFPA is integrated into the receiver.

3. The system of claim 1, wherein the DFPA includes a transimpedance amplifier.

4. The system of claim 1, wherein the operations are further configured to sample at least one basis function over an integration time to determine when the laser pulse contacted the target.

5. The system of claim 1, wherein the operations are further configured to activate a receiver carrying the DFPA for a first time period after the pulsed laser was emitted from the pulsed laser.

6. The system of claim 1, wherein the operations are further configured to receive pulsed laser return feedback from the target in the DFPA.

7. The system of claim 6, wherein the operations are further configured to identify a return signal alternating between a count up and a countdown feature in the DFPA, when the return signal alternates from the count up feature to the countdown feature the DFPA identifies a time when the pulsed laser contacted the target, and when the time at which the pulsed laser beam contacts the target is coupled with the speed of the laser beam to range the target.

8. The system of claim 1, wherein the operations are further configured to take multiple images with a receiver incorporating the DFPA; and change a sampling function over multiple images to find the range of the target.

9. The system of claim 1, wherein the operations are further configured to localize when the pulsed laser returned from the target to establish a return time.

10. The system of claim 1, wherein the operations to determine in the DFPA a time at which the pulsed laser beam returns from the target is accomplished by a Fourier basis function.

11. The system of claim 1, wherein the operations are further configured to establish a set of initial guesses of the location of the target.

12. The system of claim 1, wherein the operations are further configured to use a basis function with a sine wave function.

13. A method comprising:
syncing a pulsed laser beam with a digital-pixel focal plane array (DFPA);
emitting the pulsed laser beam from a pulsed laser towards a target at a location to which a range from the pulsed laser to the target is to be determined;
determining in the DFPA a time at which the pulsed laser beam returns from the target;
ranging the target relative to the pulsed laser based at least in part on the time at which the DFPA determined the pulsed laser beam returned from the target and the speed at which the pulsed laser beam traveled;
receiving photo current in a bi-directional counter on the DFPA;
interpreting in the counter whether the photo current is a positive pulse or a negative pulse, wherein if the photo current is a positive pulse, then the photo current occurred in a first window of time, and wherein if the photo current is a negative pulse, then the photo current occurred in a different second window of time;
determining, in the DFPA, a time when photo current switches from the positive pulse to the negative pulse, or vice versa; and
ranging the target based on the time when the DFPA determined the photo current switched and the pulsed laser beam speed.

14. The method of claim 13, further comprising:
identifying a return signal alternating between a count up and a countdown feature in the DFPA, wherein when the return signal alternates from the count up feature to the countdown feature the DFPA identifies a time when the pulsed laser contacted the target, and when the time at which the pulsed laser beam contacts the target is coupled with the speed of the laser beam to range the target.

15. The method of claim 13, further comprising:
localizing when the pulsed laser returned from the target to establish a return time.

16. The method of claim 13, wherein the DFPA includes a transimpedance amplifier.

* * * * *